United States Patent [19]

Porter

[11] 3,997,279

[45] Dec. 14, 1976

[54] DRILL BIT

[75] Inventor: L. Steven Porter, Shrewsbury, Mass.

[73] Assignee: Parker Manufacturing Co., Worcester, Mass.

[22] Filed: Jan. 20, 1975

[21] Appl. No.: 542,457

[52] U.S. Cl. .......................... 408/211; 145/116 R; 408/225

[51] Int. Cl.$^2$ .......................................... B23B 51/00

[58] Field of Search .......... 408/211, 212, 213, 210, 408/223, 224, 225, 228, 703, 226; 145/116 R

[56] References Cited

UNITED STATES PATENTS

| | | | |
|---|---|---|---|
| 252,704 | 1/1882 | Southwick | 408/223 X |
| 2,600,286 | 6/1952 | Weiland | 408/211 |
| 2,782,824 | 2/1957 | Robinson | 408/226 X |
| 2,794,468 | 6/1957 | Huxtable | 408/211 X |

*Primary Examiner*—Othell M. Simpson
*Assistant Examiner*—Z. R. Bilinsky
*Attorney, Agent, or Firm*—Norman S. Blodgett; Gerry A. Blodgett

[57] ABSTRACT

Drill bit of the type having a shank, a spade cutter, and a lead point with concave sides.

6 Claims, 6 Drawing Figures

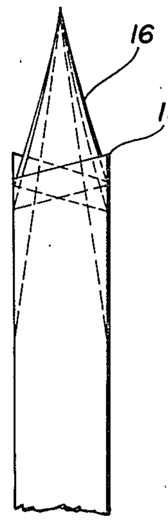
FIG. 3
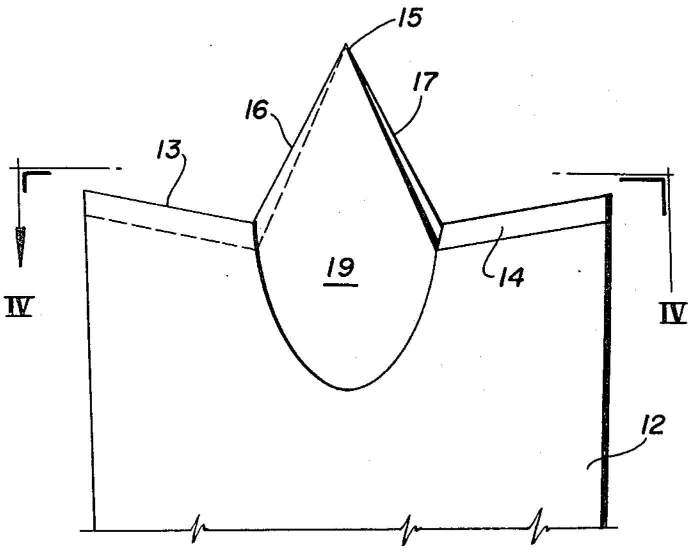
FIG. 2
FIG. 4
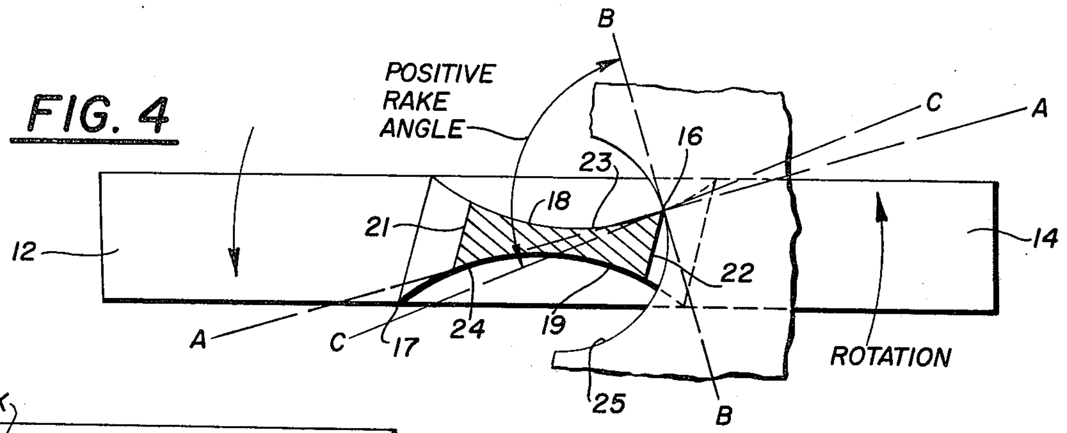
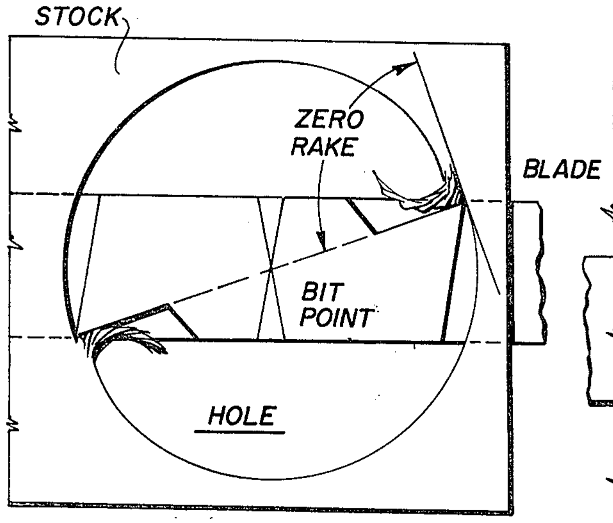
PRIOR ART
FIG. 6
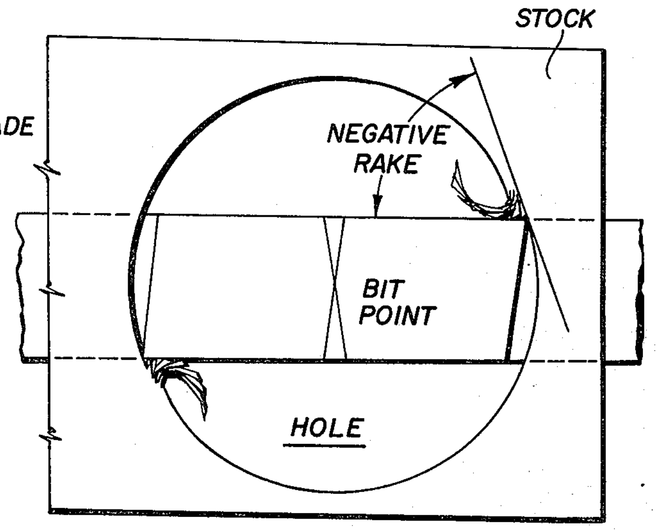
PRIOR ART
FIG. 5

DRILL BIT

BACKGROUND OF THE INVENTION

It is common practice to use a flat spade-type drill bit when boring holes in a relatively soft material, such as wood or plastic. This type of drill has a number of advantages (when compared to helical-type drill bits) among which advantages are the fact that it is inexpensive to manufacture and is easier to store. The commonly-used drill of this type uses a pointed lead point having flat sides whose cross-section (in a plane perpendicular to the axis of rotation of the drill) is a rectangle. Since the lead point proceeds the main cutting edges during most of the drilling operation (until the lead point emerges on the other side of the workpiece), this type of point continues to absorb a large amount of power during the entire drilling operation. Attempt was made to overcome these deficiencies by Robinson who showed and described an improved drill in his U.S. Pat. No. 2,782,824 which issued on Feb. 26, 1957. He sought to improve the operation of the drill by forming a V-shaped groove adjacent the leading edge of each side of the lead point. This did not, however, entirely solve the problem; tests proved that a considerable amount of the axial force absorbed by such a drill at a given rate of advance was still absorbed by the cutting action in the lead point. These and other difficulties experienced with the prior art devices have been obviated in a novel manner by the present invention.

It is, therefore, an outstanding object of the invention to provide a drill bit in which the lead point cuts with a minimum of effort.

Another object of this invention is the provision of a drill bit of the spade-type in which most of the force required for cutting is absorbed in the main cutting blades.

A further object of the present invention is the provision of a drill bit having a lead point whose cutting edge has a positive rake angle.

It is another object of the instant invention to provide a drill bit of the spade-type which is inexpensive to manufacture, which is simple to use, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a drill bit having a shank defining the drilling axis and a spade cutter generally connected to the shank and having cutting edges extending radially of the said axis. A lead point extends from the spade cutter and is defined by two edges that intersect on the said axis. Each of the two opposite faces of the lead point are formed with a concavity that results in a cutting edge with a positive rake.

More specifically, the lead point is formed with surfaces such that the intersection of the lead point by a plane that lies at a right angle to the drill axis, shows a cross-sectional shape in the form of a four-sided plane figure, two sides being straight parallel lines defined by the aforementioned edges and the other two sides being concave curves of generally circular-segmental form.

BRIEF DESCRIPTION OF THE DRAWINGS

The character of the invention, however, may be best understood by reference to one of its structural forms, as illustrated by the accompanying drawings, in which:

FIG. 2 is a front elevational view of a portion of the drill bit, FIG. 3 is a side elevational view of a portion of the drill bit, FIG. 4 is a sectional view of the invention taken on the line IV—IV of FIG. 2, and FIGS. 5 and 6 show prior art constructions.

DESCRIPTION OF THE PREFERRED EMBODIMENT

Figure 1:
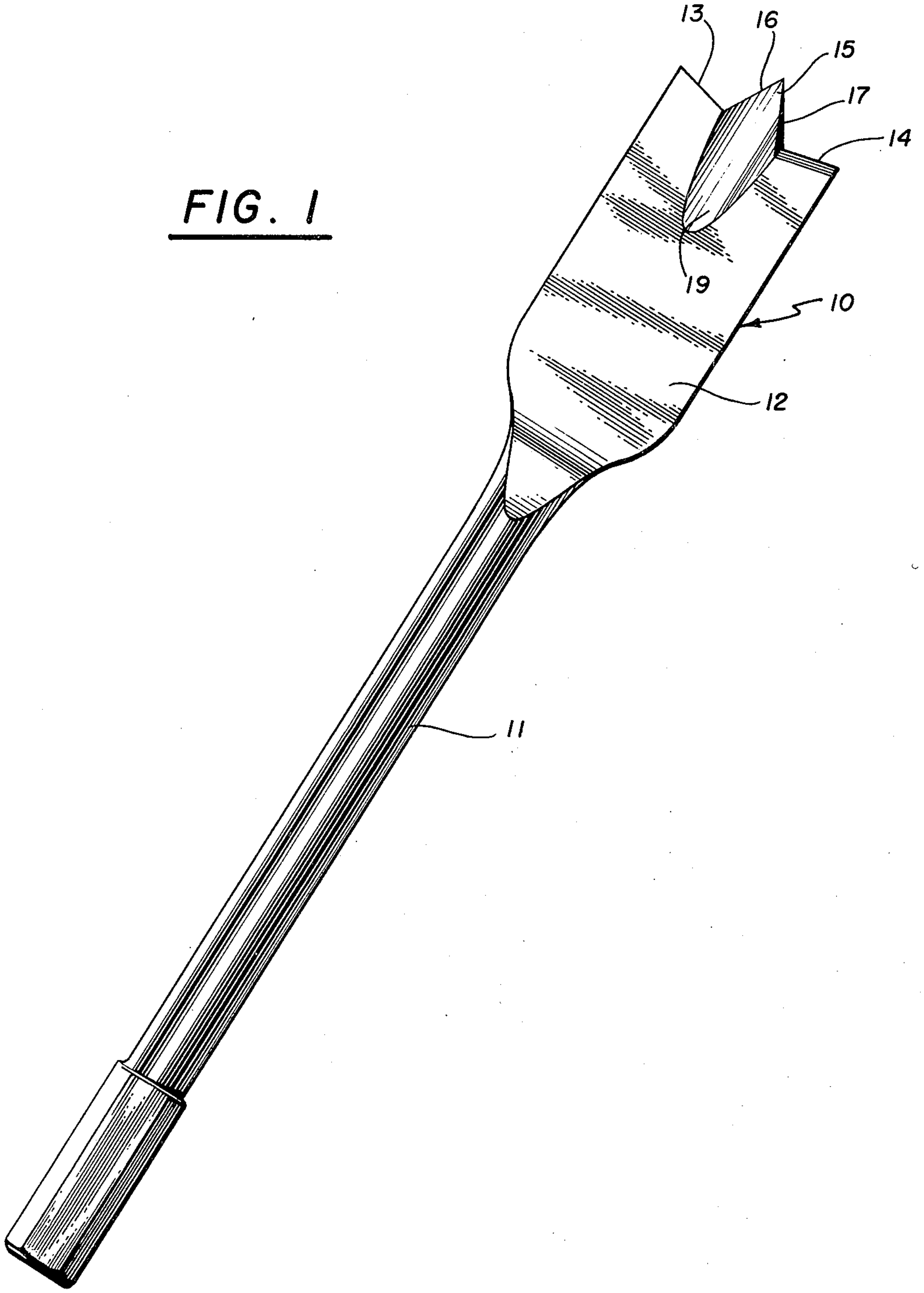
FIG. 1 is a perspective view of a drill bit embodying the principles of the present invention.

Referring first to FIG. 1, wherein are best shown the general features of the invention, the drill bit, indicated generally by the reference numeral 10, is shown as having a shank 11 adapted to be held in a power drill and defining the drill axis. At one end of the shank is provided an integral spade cutter 12 having cutting edges 13 and 14. A lead point 15 extends from the spade cutter and is generally defined by two edges 16 and 17 that intersect on the said drill axis. The two opposite faces of the lead point are formed with concavities that result in a cutting edge with a positive rake, one of these faces having a surface 19 is shown in FIG. 1.

FIGS. 2, 3, and 4 show the details of construction of the lead point 15. The intersection of the point 15 by the plane IV—IV of FIG. 2 indicates that the point has a cross-sectional shape in the form of a four-sided plane figure which is shown as hatched in FIG. 4. The figure has two sides which are straight, parallel lines defined by the aforementioned two edges 16 and 17, while the other two sides are concave curves of generally circular-segmental form, these curves being formed by the concave surfaces 18 and 19 formed on the opposite sides of the lead point.

As can be seen in FIG. 4, a line C—C, which is tangential to the curved line 18 at the point of its intersection with the side 22, lies at an obtuse angle (indicated as positive rake). Each of the concavities 18 and 19 is formed by grinding with an abrasive wheel in the shape of a surface of revolution arranged relative to the point in such a way that its generatrices pass successfully through the intersection of the two edges as it rotates. In the preferred embodiment the surface of revolution of the abrasive wheel is a right circular cylinder. This makes the concave edges 18 and 19 conic sections and, since the cone is one of infinite taper, the curves are parabolas.

The operation of the invention will now readily be understood in view of the above description. The drill bit 10 is suitably mounted in a tool, which holds the shank 11 in its chuck. When the chuck is rotated, the shank turns and carries the entire drill with it, so that it rotates about the drill axis. The drill point 15 penetrates the material to be cut with the sides 16 and 17 doing the cutting. Eventually, the lead point extends far enough into the workpiece (which is assumed to be made of wood) that the blade edges 13 and 14 contact the wood and begin to generate a bore or hole of a radius determined by the width of the spade 12. Since the novel features of the present invention reside in the characteristics of the lead point 15, FIG. 4 shows particularly well its operation. FIG. 4 shows a mid point of the lead point and the circle 25 represents the hole being drilled at that point and at that moment, the circle 25 is being generated in the wood by the intersection of the surfaces 18 and 19 with the edges 16 and 17; in FIG. 4 this is indicated by the intersection of the curved lines 23 and 24 with the lines 21 and 22 along the edges 16 and 17. The line B—B is a line through the point 16 which is the intersection of curve 23 with the line 22. The line C—C which is tangential to the curve 23 at that point resides at an obtuse angle to the line B—B and, therefore, gives a positive rake angle. Since the line 22 is inclined in the usual way away from the tangent B—B, the result is an effective cutting edge which produces a true cutting chip in the wood, rather than merely scraping it.

The advantages of the present invention will be best understood by referring first to the prior art constructions. In FIG. 5, which shows the most ancient of the constructions, the edge of the lead point is inclined away from the tangent so that the drill apparently has a sharp edge. An examination of the geometry, however, indicates that the edge has negative rake, since the angle between the tangent to the whole circle through the cutting edge point is less than 90° and thus gives "negative" rake. The chip generated in this way does so with a great expenditure of energy. FIG. 6 shows the state of the prior art as developed by the aforementioned Robinson patent. The surfaces of the edges are inclined away from a tangent through the cutting edge and a V-shaped groove is cut having the surface which passes through the cutting edge to produce a very thin sharp cutting edge, but because it has an effective zero rake, the net effect is that the cutting edge simply drags or scrapes over the surface of the workpiece and produces an inadequate chip. The present invention, because it provides for the concave faces 18 and 19 on either side of the lead edge, produces positive rake, which means that, not only is the edge thin and sharp, but it has a positive rake angle, so that it cuts effectively. This means that less energy is used in cutting with the lead point, which in turn, means that more energy is available for cutting on the radial edges 13 and 14 of the drill bit. When the abrasive wheel that grinds the concave surfaces 18 and 19 is selected of a proper diameter, and its axis of rotation is selected at a suitable angle, the result will be the provision of positive rake angle entirely along the cutting edge, as well as a sharp point at the end of the lead point as contrasted with the wedge-type point which has been featured in the prior art constructions.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A drill bit, comprising:
a. a shank defining an axis,
b. a spade cutter connected to the shank and having cutting edges extending generally radially of the said axis, and
c. a lead point extending from the spade cutter formed by two edges that intersect the said axis, the lead point being provided with concave faces extending symmetrically of the axis and from edge to edge throughout a substantial portion of the point, so that the intersection of the point by a plane that is at a right angle to the said axis gives a cross-sectional shape in the form of a 4-sided plane figure, two sides of the figure being straight parallel lines defined by the aforementioned two edges and the other two sides being concave curves of generally circular-segmental form, so that a cutting edge is provided with a positive rake.

2. A drill bit as recited in claim 1, wherein a line tangential to a curved side at the intersection of that curved side with the adjacent straight side lies at an obtuse angle to a line passing through the said intersection and lying at a right angle to a line joining the said intersection to the said axis.

3. A drill bit as recited in claim 1, wherein a first line segment tangential to a first curved side at the intersection of that curved side with the adjacent straight side starting at the intersection and extending through the bit lies at an obtuse angle to a second line segment passing starting at the said intersection and extending toward a center of radius of the first curved side, and lying at a right angle to a line joining the said intersection to the said axis and perpendicular thereto.

4. A drill bit as recited in claim 1, wherein each concavity is formed as a surface of revolution arranged relative to the point in such a way that its generatrix passes through the intersection of the two edges.

5. A drill bit as recited in claim 1, wherein the said concave curves are approximately conic sections.

6. A drill set as recited in claim 4, wherein the surface of revolution is cylindrical.

* * * * *